Patented Oct. 27, 1953

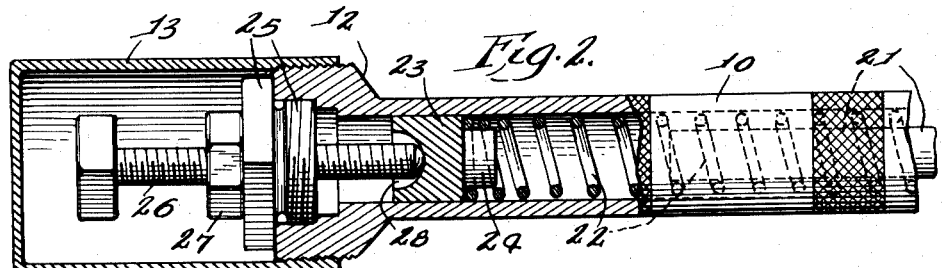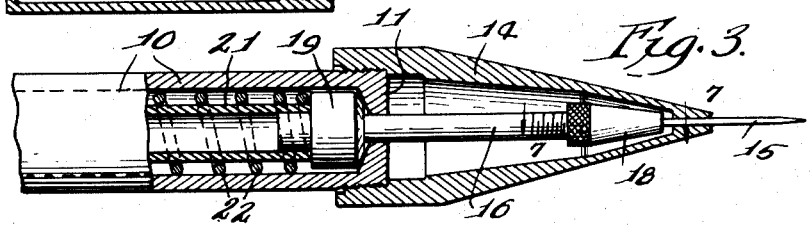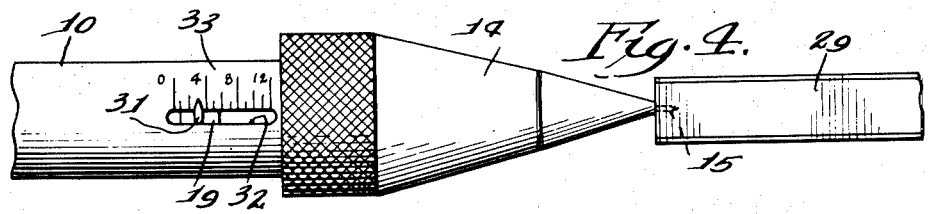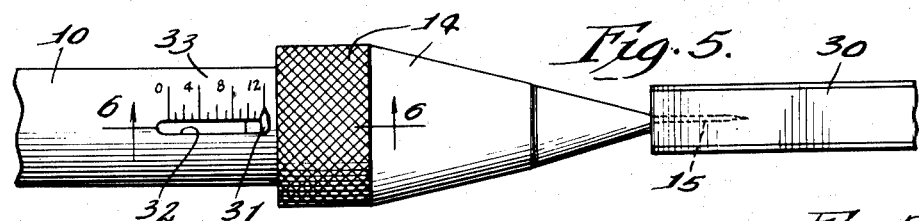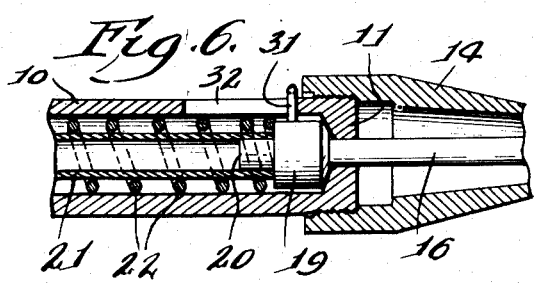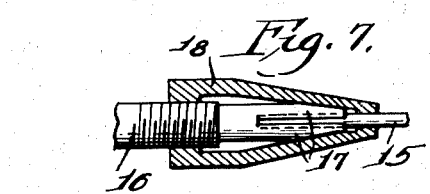

2,656,716

UNITED STATES PATENT OFFICE 2,656,716

PENETROMETER

Gilbert A. Hoggatt, Winnetka, Ill., assignor to Certain-Teed Products Corporation, Ardmore, Pa., a corporation of Maryland Application November 18, 1949, Serial No. 128,164

2 Claims. (Cl. 73—81)

This invention relates to penetrometers of the type adapted for general use for determining the hardness at or near the surface of any object to be tested, but designed particularly for testing the hardness of the edge portions of gypsum wall board panels for checking possible calcination of such edge portions of the panels in their movement through the kilns in which the panels are dried after their fabrication. It is the object of the invention to provide a readily portable instrument of comparatively light weight by the use of which a workman can very quickly and easily test the hardness of the edge portions of a pile of wallboard panels.

The preferred form of mechanism I have provided for accomplishing my objects comprises a needle slidably mounted in a tapered end portion of a housing member so as to be retractable lengthwise into the housing, being held normally in protracted or extended position by means of a long coiled spring of such strength as to apply a yielding pressure of ten pounds on the needle for holding the needle in extended position, the length of the spring being such that the pressure of the spring on the needle in its extended position is not radically less than the pressure on the needle in the retracted position of the needle. My improved device comprises also gauge means for indicating visually the amount of penetration of the needle into the article being tested, together with means for adjusting the degree of compression of the spring for bringing the device to a predetermined standard of operation.

It is another object of my invention to improve devices of this type in sundry details hereinafter pointed out. The preferred means by which I have accomplished my several objects are illustrated in the accompanying drawing, in which:

Fig. 1 is a side face view of my improved device.

Fig. 2 is a horizontal sectional view through one end portion of my device, being taken on an enlarged scale substantially at the line 2—2 of Fig. 1.

Fig. 3 is a horizontal sectional view through the opposite end portion of my device, being taken also on an enlarged scale substantially at the line 3—3 of Fig. 1.

Figs. 4 and 5 are views of a fragmentary portion of one of my improved devices with the needle forced to varying degrees of penetration into pieces of wallboard of different degrees of hardness.

Fig. 6 is a vertical sectional view through a portion of my improved device, being taken substantially at the line 6—6 of Fig. 5; and Fig. 7 is an enlarged detailed view, being a horizontal sectional view taken on an enlarged scale substantially at the line 7—7 of Fig. 3.

Referring now to the several figures of the drawing, in which corresponding parts are indicated by the same reference characters, 10 indicates a tubular housing member comprising the principal portion of the framework or body of my device, provided with a cross-positioned wall portion 11 at its forward end portion at the right in Figs. 3 and 6, and with an enlarged head portion 12 at the end portion at the left in Fig. 2. The head 12 has a metal cap 13 removably secured by screw threads thereon in position to cover the parts mounted in the head as hereinafter described. At the forward end of my device, at the right in Figs. 1 and 3, a tapered guide and housing member 14 is secured removably in position by means of screw threads so as to form the forward end portion of the body of the device.

As is best shown in Fig. 3, a slender steel needle 15 of about fifty thousandths of an inch in diameter has a working fit in a suitable slide bearing in the forward end of the tapered member 14, such needle being removably mounted on the forward end of a metal plunger 16 by means of an adjustable chuck of any approved type adapted to be tightened on the needle by rotary movement about said plunger. In the arrangement shown, (see Fig. 7) the plunger 16 is split at its forward end to provide spaced prongs 17 between which the needle is inserted, such prongs being tightened into gripping relationship about the needle by means of a tapered sleeve 18 adjustably mounted on the plunger by means of screw threads.

On the rear end of the plunger 16, I have provided an enlarged head 19 adapted by engagement with the end plate 11 to limit the movement of the plunger toward the right in Fig. 3, the plunger having a working fit in said end plate so as to be movable freely longitudinally of the plunger. On the rear face of the head 19, I have provided a lug 20 upon which a tubular pipe 21 is fitted so as to receive thereon a fairly heavy coiled spring 22 whose front end bears against the head 10 so as to apply pressure on said head and on the needle 15 connected therewith. In the arrangement shown, the needle 15 is of such length that when it is secured in position at the limit of its movement toward the left in Fig. 3 with respect to the plunger, with the plunger moved to the limit of its movement toward the right in said Fig. 3, the needle shall extend exactly three-quarters of an inch beyond the forward end of the tapered housing member 14. As best shown in said Fig. 3, the needle is shaped to provide a fairly long tapered point at its forward end, with the extreme end of the needle blunted slightly.

At its rear end, at a point a short distance to the left of the rear end of the tubular guide pipe 21 as shown in Fig. 2, the spring 22 bears against a bearing block 23 slidably mounted in the tubular housing member 10, having a lug 24 on its front face extending into the end of the spring. In the rear end of the head 12 of the housing member 10, I have mounted a plug 25 removably in position by means of screw threads, said plug having a set screw 26 adjustably mounted therein by means of screw threads, with a locking nut 27 on the set screw for locking the screw in any desired adjusted position, said set screw bearing at its forward end against the bearing block 23 within a socket 28 therein, as is clearly shown in Fig. 2.

In the use of my improved device, with the parts in the positions as shown in Figs. 2 and 3 and with the set screw 26 locked in such position as to insure that the spring 22 shall press forwardly on the head 19 with a pressure of 10 pounds, and with the needle 15 extending just twelve-sixteenths of an inch beyond the end of the tapered housing member 14, the needle 15 is placed against the face of an article to be tested—such as the wallboard 29, as shown in Fig. 4, or the wallboard 30, as shown in Fig. 5. The instrument as a whole is then pressed forwardly toward the board for forcing the needle 15 into the core of the board. If the core is of the normally desired hardness, the needle 15 under the pressure of ten pounds applied by the spring 22 will be forced only a very short distance into the core as the instrument is moved forwardly for bringing the end of the tapered housing member 14 into engagement with the face of the board, as shown, for example, in Fig. 4. If, however, the wallboard being tested has been subjected to overheating in the drying kiln to the extent necessary for causing a substantial degree of calcination of the edge portions of the board, under such circumstances the needle 15 under the selected 10 pounds pressure will be forced a substantial distance into the core, as shown in Fig. 5 in which the needle extends its full length into the core of the board.

While my improved instrument is designed particularly for use for testing gypsum wallboards, it may be used alternatively for other purposes. In any case, the spring 22 is to be selected so as to have the characteristics required for the designed use. When designed for testing wallboards, the spring is preferably such that a pressure of approximately ten pounds is applied against the head 19 when the set screw 26 is at about the middle of its range of adjustment.

The gauging means provided for showing the extent of retraction of the needle 15 in a testing operation, and thus indicating the extent of penetration of the needle into the article being tested, comprises an index finger 31 removably mounted in the head 19 of the plunger and extending sidewise through a longitudinally positioned slot 32 in the wall of the housing member 10, as is shown in Figs. 5 and 6. The outer end of the finger 31 is turned laterally to overlie the wall of the housing member 10 which is provided with scale markings at 33 in position for use in connection with the index 31. In the arrangement shown, the graduated scale markings from 0 to 12 are spaced at one-sixteenth of an inch intervals, with the "12" marking corresponding with the position of the index when the needle extends the full twelve-sixteenths of an inch beyond the end of the tapered housing member 14, with no pressure being applied externally on the body of the device. This arrangement insures that, when the needle which normally extends twelve-sixteenths of an inch beyond the end of the tapered housing member 14 is completely retracted within such tapered housing, the index 31 shall stand opposite the "0" reading. Under these conditions, the gauge reading on Fig. 5, with the needle fully extended, indicates a penetration of "12," which means that the needle 15 has penetrated twelve-sixteenths of an inch under approximately ten pounds pressure into the face of the board 30, which board is thus shown to be abnormally soft, indicating substantial calcination of the gypsum of the core. In Fig. 4, on the other hand, with the index 31 standing at about the "3" reading on the scale, a penetration of "3" is shown, meaning that the needle 15 under the pressure by the spring 22 has penetrated approximately three-sixteenths of an inch into the face of the board 29, indicating that the board 29 is of normal hardness and was not appreciably calcined during the drying operation.

It will be understood that when the needle is in substantially retracted position, as for example as shown in Fig. 4, the pressure of the spring 22 on the needle is increased to an appreciable extent due to the then shorter effective length and increased compression of the spring. This characteristic of the operation of the device is not particularly objectionable, however, so long as it is understood by the user of the instrument that the readings are based on varying pressures.

In the production of wallboards, the panels are dried at a selected temperature which can be used safely under normal conditions without danger of objectionable calcination of edge portions of the board, such temperature being selected fairly high so as not to slow down the operation of the wallboard machine. There may be variants, however, in the procedure by which the wallboard is made, by reason of which the product, which is dried satisfactorily at a selected temperature at one time without any resulting calcination of the board by the drying operation, might at another time be changed sufficiently without any change in appearance of the board so as to cause the board to be calcined to an objectionable extent at the same temperature. It is desirable, accordingly, that the hardness of the edge portions of the boards coming from the drying kiln should be tested at frequent intervals, so as to enable the operator to make the necessary adjustments of the drying conditions if the tests on the boards show any appreciable tendency for calcination of the gypsum cores of the boards. Under these circumstances, my invention is of great importance for this particular use, entirely aside from other uses for which the instrument is designed. The portability of the device and the ease of handling it, together with its marked effectiveness for its designed uses, make it so readily available as to invite and encourage its use extensively whereby the art of wallboard manufacture is substantially advanced.

By the use of my improved arrangement, by which the normal pressure of the spring can be adjusted to a desired predetermined strength, and by which the degree of hardness of the article being tested under a given spring pressure may be read in terms of unit penetration of the needle into the article, similarly arranged and adjusted devices in use in different board manufacturing plants may show the relative efficiency of the work at the different plants.

With the housing member 14 tapered to comparatively small size at its forward end, as shown at the right in Figs. 1 and 3, the device is capable of being applied conveniently to the separate individual boards even when the boards are arranged in a pile with their edge portions positioned in the same vertical plane. With the needle 15 applied at a middle point on the edge of a board of any desired thickness down to a thickness of three-eights of an inch or even less, the device can be employed to advantage without any danger that the end of the housing 14 shall be brought into contact with the next adjacent board.

While I prefer to employ the form and arrangement of parts as shown and described, my invention is not to be limited thereto except so far as the claims may be so limited, it being understood that changes might well be made in the form of the device without departing from the spirit of the invention.

I claim:

1. In a readily portable device for testing the calcination of wallboard comprising a tubular body member having a wall closing one end thereof, said wall having an opening therein, an enlarged tapered guide member attached to the closed end of the tubular member on the outer surface thereof, a plunger slidably mounted within the tubular member so as to be movable longitudinally in respect thereto, the plunger extending through the opening in the end wall into the guide member to a point adjacent the free end thereof, the plunger having a head on one end thereof engaging the end wall of the body member to limit this movement in one direction, and a chuck on the other end extending into the inner tapered end of the guide member, the chuck comprising split prongs at the extreme end thereof and a tapered sleeve threadably connected with the end of the plunger adjacent the split prongs, the inner tapered surface of the tapered sleeve engaging the prongs to force the prongs toward each other, a needle held within the chuck by the engagement of the inner tapered surface of the sleeve with the prongs, the needle extending through an opening in the free end of the guide member and slidable therethrough and normally extending beyond the free end of the guide member a predetermined distance and being relatively thin in characteristic in respect to the free end of the guide member, the opening in the free end of the guide member being of such size that the needle will be properly guided and rigidly held thereby, an index member carried by the plunger head and extending outwardly therefrom, the indexing member projecting through a slotted opening in the wall of the tubular member adjacent the tapered guide member, a graduated scale adjacent the slotted opening cooperating with the index member, a compression spring mounted within the body member, one end of which bears against the head of the plunger on the side opposite to the side engaging the end wall of the body member, the other end bearing against a block slidably mounted within the body member adjacent an open end opposite to the end carrying the plunger, a plug member threadably engaging the open end of the body, a set screw threadably engaging the plug member and extending into the open end and bearing against one end of the bearing block, actuation of the set screw causing the bearing block to move and adjust the compression of the spring, an enlarged cap threadably connected to the end of the tubular member to enclose and protect the set screw, whereupon with the spring properly adjusted and the needle extending beyond the guide member the required distance, testing of the calcination of the edge of a wallboard is accomplished by forcing the needle into the edge and reading the amount of penetration by the needle on the graduated scale.

2. In a readily portable device for testing the hardness of a material comprising a tubular body member having openings in both ends thereof, a tapered guide member removably carried by one end of the body member, a plunger slidably carried by the body member and extending through the opening in one end into the guide member, means on the body end of the plunger to retain the plunger in the body member, chuck means on the other end of the plunger and positioned within the guide member to removably and adjustably retain a penetrating member on the plunger, the penetrating member being slidably retained within an opening in the free end of the guide member and extending beyond the free end of the guide member a predetermined distance, the opening being of such size relative to the penetrating member so as to properly guide and rigidly hold the member, an indicating member carried by the plunger extending through a slot in the wall of the body adjacent the one end thereof, scale markings on the body adjacent the slot cooperating with the indicating member, a coil spring freely mounted within the body member, one end of the coil spring bearing against the plunger to cause protraction of the penetrating member the predetermined distance beyond the guide member, a block slidably mounted within the body member adjacent the other end thereof and bearing against the other end of the spring, means carried by the other end of the body to move the block to adjust the spring to predetermined pressure, a cover removably carried by the other end of the body member to protect the last mentioned means, whereby upon proper adjustment of the pressure of the spring and extension of the penetrating member beyond the guide member the required distance, the hardness of the material may be tested by forcing the penetrating member into the material by the pressure of the spring and reading the amount of penetration on the scale.

GILBERT A. HOGGATT.

References Cited in the file of this patent

UNITED STATES PATENTS

| Number | Name | Date |
|---|---|---|
| 989,471 | Abraham | Apr. 11, 1911 |
| 1,037,596 | Coppage | Sept. 3, 1912 |
| 1,519,602 | Zimmerman et al. | Dec. 16, 1924 |
| 1,942,982 | Schneider | Jan. 9, 1934 |
| 2,130,751 | Van Der Meer | Sept. 20, 1938 |
| 2,323,925 | Markwardt | July 13, 1943 |
| 2,372,662 | Dewey | Apr. 3, 1945 |
| 2,446,956 | Rose | Aug. 10, 1948 |
| 2,520,387 | Dobry et al. | Aug. 29, 1950 |